(12) United States Patent
Mateo et al.

(10) Patent No.: US 10,549,867 B2
(45) Date of Patent: Feb. 4, 2020

(54) DEVICE FOR PROTECTING THE AIRFOILS OF AN AIRCRAFT AGAINST BAD WEATHER AND POSITIONING METHOD

(71) Applicant: Airbus Operations SAS, Toulouse (FR)

(72) Inventors: Stéphane Mateo, Dieupentale (FR); Romain Hector, Toulouse (FR); Christophe Couet, Arbas (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/842,584

(22) Filed: Dec. 14, 2017

(65) Prior Publication Data
US 2018/0170578 A1 Jun. 21, 2018

(30) Foreign Application Priority Data

Dec. 15, 2016 (FR) ...................................... 16 62488

(51) Int. Cl.
*B64F 1/00* (2006.01)
*B64F 1/36* (2017.01)

(52) U.S. Cl.
CPC ................ *B64F 1/005* (2013.01); *B64F 1/36* (2013.01)

(58) Field of Classification Search
CPC .............................. B64F 1/005; B64F 1/3055
USPC ......... 135/87, 90, 908; 244/1 R, 114 R, 115; 14/71.5; 150/166; 52/83
See application file for complete search history.

(56) References Cited

U.S. PATENT DOCUMENTS

| 2,723,811 A | 11/1955 | Blomquist |
| 3,524,207 A * | 8/1970 | Giarretto ................... B64F 1/00 14/71.5 |
| 3,628,729 A * | 12/1971 | Thomas ............... A01G 25/092 239/729 |
| 3,905,567 A | 9/1975 | Menke et al. |
| 4,392,622 A * | 7/1983 | McClaflin ............... B64C 25/10 244/102 A |
| 4,877,189 A * | 10/1989 | Williams ............. A01G 25/097 239/749 |
| 5,340,055 A | 8/1994 | Rodyniuk et al. |

(Continued)

FOREIGN PATENT DOCUMENTS

| WO | 9412391 | 6/1994 |
| WO | 2004041530 | 5/2004 |

OTHER PUBLICATIONS

French Search Report, dated Aug. 4, 2017 priority document.

*Primary Examiner* — Joshua J Michener
*Assistant Examiner* — Matthew J Gitlin
(74) *Attorney, Agent, or Firm* — Greer, Burns & Crain, Ltd.

(57) ABSTRACT

Devices for protecting aircraft against bad weather. A device for protecting a wing of an aircraft including a load-bearing structure for a protective wall for the wing, the load-bearing structure having a supporting frame having at least two uprights linked by at least one cross member, at least one upright, at the end of the frame having a linking attachment arrangement permitting at least rotation about an axis perpendicular to the surface, the other uprights, each having one foot with an arrangement configured to facilitate the movement of the frame over the surface on which the frame rests. The protection device enables immediate, rapid and easy positioning requiring very few operators.

14 Claims, 5 Drawing Sheets

(56) References Cited

U.S. PATENT DOCUMENTS

| | | | | |
|---|---|---|---|---|
| 5,597,005 | A | 1/1997 | Thomas | |
| 6,212,724 | B1* | 4/2001 | Zhou | B64F 1/3055 |
| | | | | 14/69.5 |
| 9,359,783 | B1* | 6/2016 | Josdal | E04H 15/18 |
| 10,015,938 | B1* | 7/2018 | Malsam | A01G 25/167 |
| 2009/0205147 | A1* | 8/2009 | Gil Coto | B64F 1/305 |
| | | | | 14/71.5 |
| 2015/0298823 | A1* | 10/2015 | Cox | B64F 1/30 |
| | | | | 14/71.5 |
| 2016/0366841 | A1* | 12/2016 | Wilson | A01G 25/16 |
| 2016/0378086 | A1* | 12/2016 | Plymill | G08B 13/18 |
| | | | | 700/284 |
| 2017/0105370 | A1* | 4/2017 | Abts | A01G 25/165 |
| 2017/0295730 | A1* | 10/2017 | Abts | A01G 25/092 |
| 2017/0349060 | A1* | 12/2017 | Abts | B60L 15/20 |
| 2018/0031110 | A1* | 2/2018 | Cook | F16H 57/0413 |
| 2018/0100606 | A1* | 4/2018 | Korus | A01G 25/092 |
| 2018/0141679 | A1* | 5/2018 | Power | B64F 1/005 |
| 2019/0008101 | A1* | 1/2019 | Teeter | A01G 25/02 |
| 2019/0009927 | A1* | 1/2019 | Obinna | B64F 1/3055 |

\* cited by examiner

DEVICE FOR PROTECTING THE AIRFOILS OF AN AIRCRAFT AGAINST BAD WEATHER AND POSITIONING METHOD

CROSS-REFERENCES TO RELATED APPLICATIONS

This application claims the benefit of the French patent application No. 1662488 filed on Dec. 15, 2016, the entire disclosures of which are incorporated herein by way of reference.

BACKGROUND OF THE INVENTION

The present invention relates to the domain of devices for protecting aircraft airfoils against bad weather such as hail, storms and the like. The present invention also relates to the positioning method for such a device.

In the domain of aeronautics, it is sometimes necessary to store aircraft while they are being assembled, undergoing maintenance work or while waiting to be moved outside a hanger. The damage caused by bad weather, such as hail, may delay repair work and engender significant additional expense.

As shown in patent WO2004/041530, the owners of small airplanes, caravans and other vehicles are concerned by the damage caused by hail. Since these types of vehicles are large, it is often necessary to park such vehicles outside. The document proposes a tarpaulin with multiple pockets that has an opening for inserting a fluid such as air, water, foam or the like. The tarpaulin thus filled dampens the impact of hailstones and protects the vehicle. Furthermore, the tarpaulin can be emptied after use and occupy very little storage space.

However, if the vehicle is very large, arranging the tarpaulin to cover the vehicle is difficult and may be made more difficult by unfavorable weather conditions. Furthermore, the vehicle may suffer significant damage in the time required to prepare the tarpaulin and to cover the vehicle.

The present invention is intended to propose a new type of protection device designed to overcome the drawbacks set out above by proposing a simple protection device that can be positioned quickly and easily.

SUMMARY OF THE INVENTION

To do so, the present invention proposes a device for protecting a wing of an aircraft that is characterized in that it includes a load-bearing structure for a protective wall for the wing, the load-bearing structure having a supporting frame having at least two uprights linked by at least one cross member, at least one upright, referred to as the static upright, at the end of the frame having linking attachment means permitting at least rotation about one axis, the other uprights, referred to as moveable uprights, each having one foot with means designed to facilitate the movement of the frame over the surface on which the foot rests.

The protection device has at least one of the following optional features, individually or in combination.

The load-bearing structure carries the wall overhanging the frame.

The wall is carried by a lattice structure including guys.

One of the edges of the wall has a roll.

The foot or feet of the moveable upright or uprights are provided with casters, at least one of which is motorized to enable the frame to be moved.

The foot or feet have a stabilizer.

The present invention also relates to the system for protecting the wings of an aircraft including two protection devices having at least one of the optional features listed above, individually or in combination, and near which the surface on which the aircraft stands includes attachment means complementing those provided on the linking upright, enabling at least rotation about an axis Y-Y perpendicular to the surface.

A marking visually identifying the path of each protection device is provided on the surface.

The present invention also relates to the method for using the protection device having at least one of the optional features listed above, individually or in combination. The method includes a step in which the protection device is moved to a wing of an aircraft, the frame being arranged alongside a leading edge or trailing edge of the wing such that the wall covers the surface of the wing.

The method comprises:

a step in which the aircraft is positioned between the devices, a step in which the protection devices are moved to an operational position in which the wings of the aircraft are protected, a step in which the protection devices are stopped and locked in the operational position, a step in which the protection devices are moved to an idle position in which the aircraft is released, a step in which the protection devices are stopped and locked in the idle position.

BRIEF DESCRIPTION OF THE DRAWINGS

Other objectives, advantages and features of the invention are set out in the description of the protection device according to the invention below, given by way of non-limiting example and with reference to the attached drawings, in which.

DETAILED DESCRIPTION OF THE PREFERRED EMBODIMENTS

Figure 1:
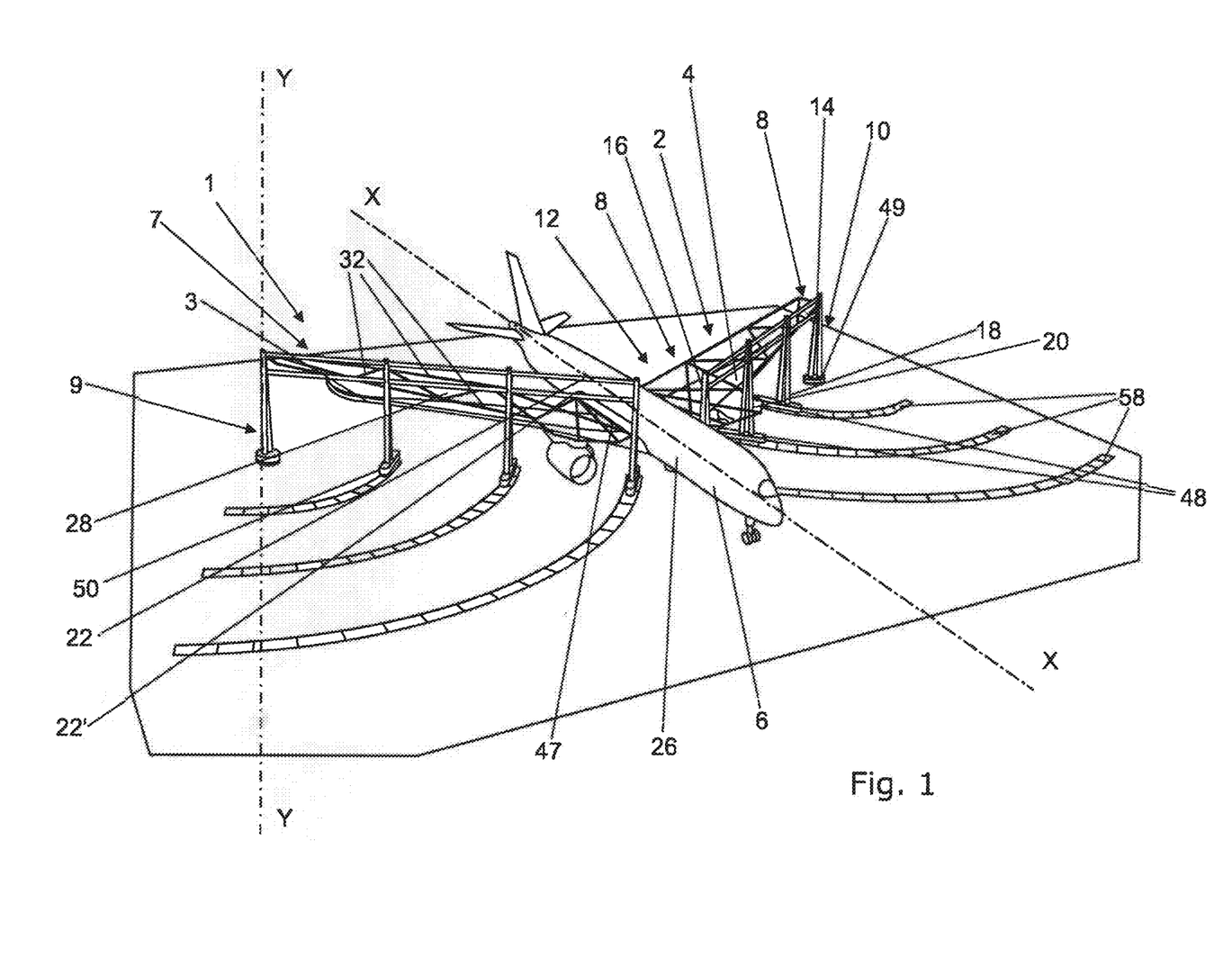
FIG. 1 is a schematic perspective view of the protection device for an aircraft in the operational position.
Figure 2:
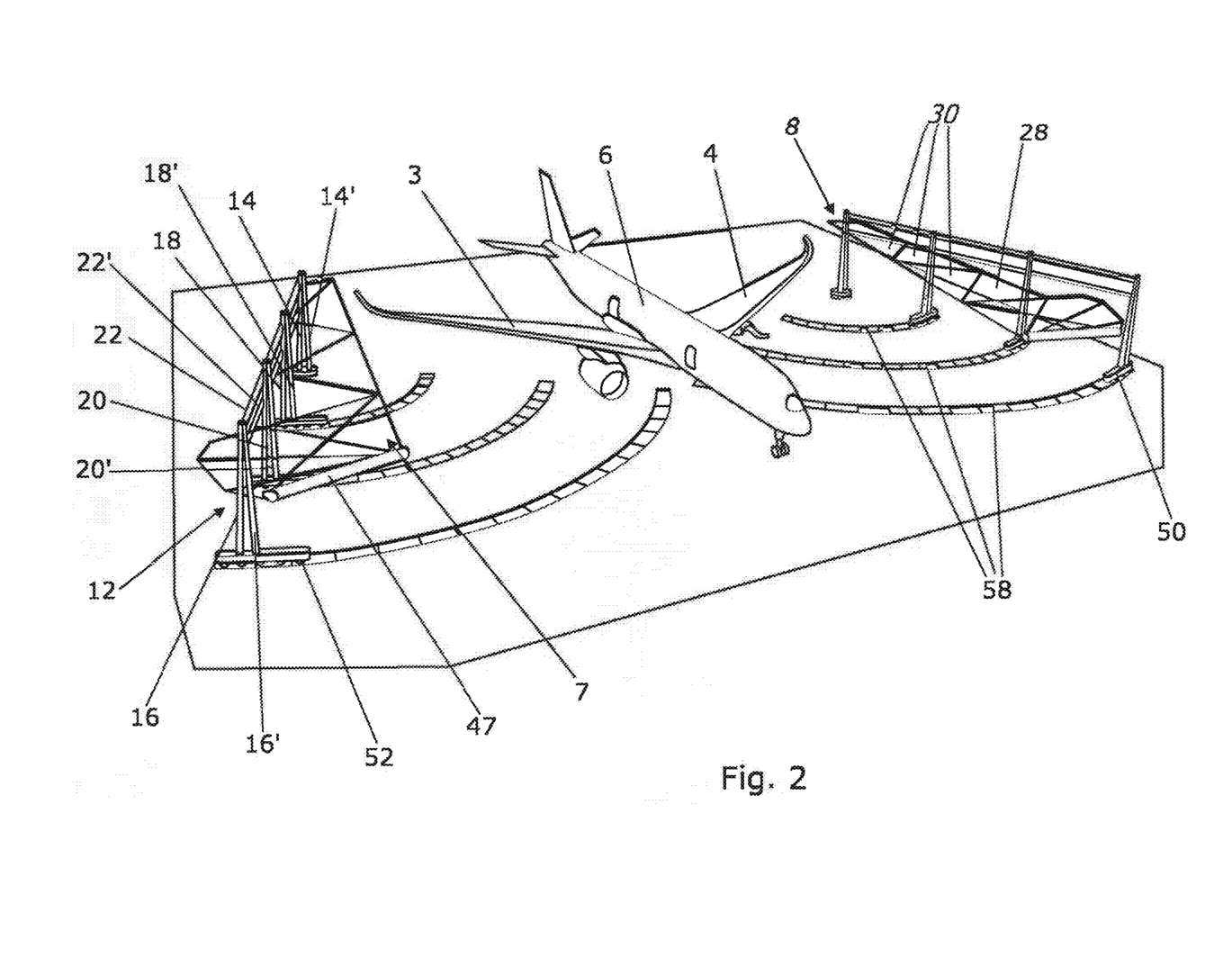
FIG. 2 is a schematic perspective view of the protection device for the aircraft shown in FIG. 1 in the idle position.
Figure 3:
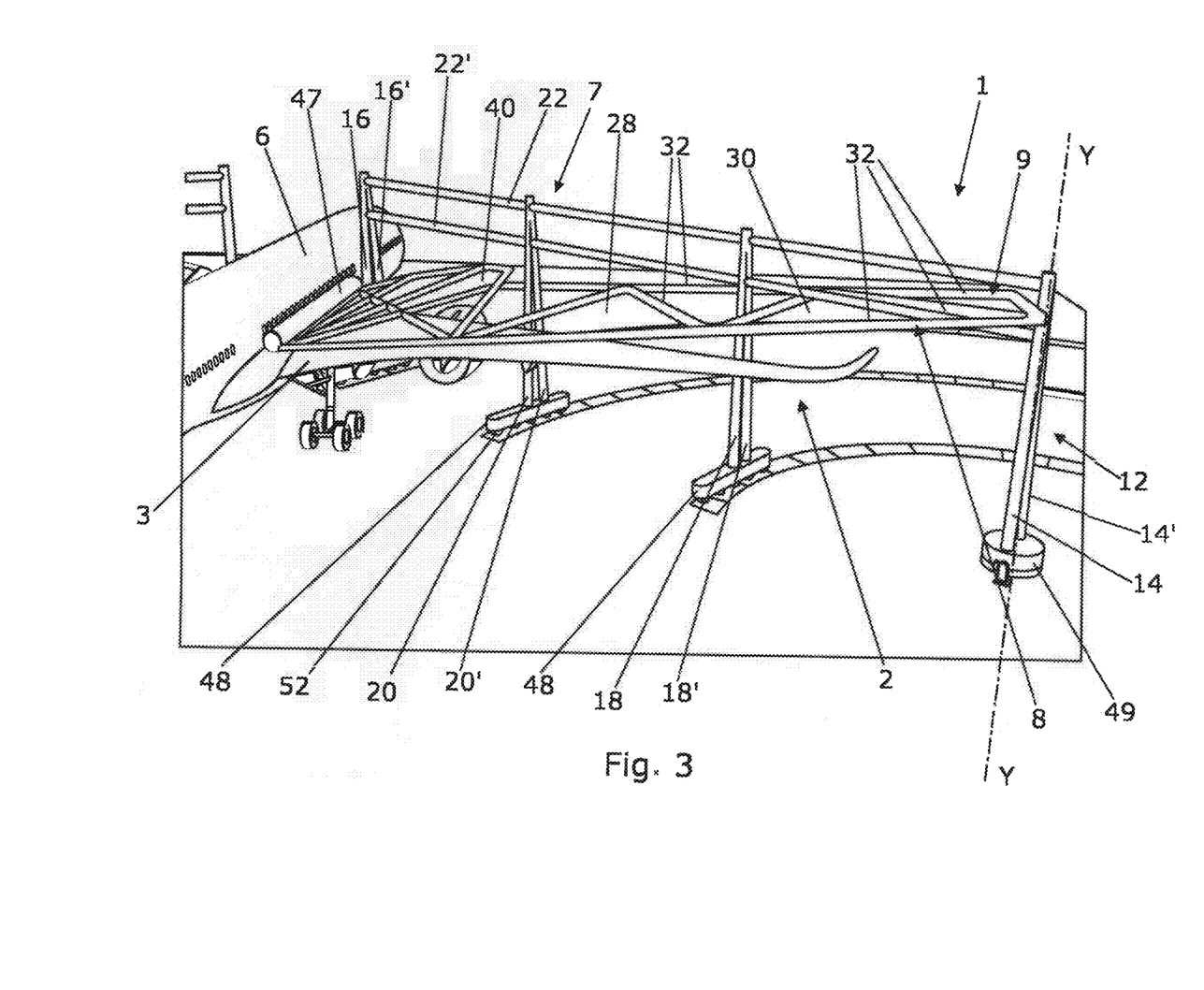
FIG. 3 is a schematic perspective view of a portion of the protection device positioned close to one of the two wings of the aircraft shown in the previous figures, in the operational position.

As shown in FIGS. 1 to 3, the present invention relates to a protection device 1, 2 for the wings 3, 4 of an aircraft 6. The protection device for each wing comprises a strong moveable cover 7, 8 overhanging a wing 3, 4 using a moveable support system 9, 10 that can move the cover quickly and easily, at least partially above the wing.

The protection device 1 is described below for a wing 3 of the aircraft 6 in consideration of the fact that the protection device 2 intended to protect the other wing 4 is entirely symmetrical about the central longitudinal axis X-X of the aircraft when the protection devices 1, 2 are in the operational position about the aircraft.

The support system 9 of the protection device 1 for the wing 3 comprises a frame 12 with at least two uprights 14, 16. More specifically, in the embodiment shown, the frame has four uprights 14, 16, 18, 20. Each of the uprights 14, 16, 18, 20 has a counterpart 14', 16', 18', 20'. The uprights 14 to 20 and 14' to 20' are joined at the upper ends thereof to form a triangular base. All of the uprights are the same height. Alternatively, the uprights may be vertical and parallel to one another.

The uprights are linked by at least one cross member 22. In the example shown, the uprights (14, 18), (18, 20), (20, 16), (14', 18'), (18', 20'), (20', 16') are gradually linked one by one by at least one cross member, and in the example illustrated, two cross members 22, 22' respectively. In the example illustrated, the cross member 22, respectively 22', is integral from an upright 14, respectively 14', at one of the ends of the frame to another upright 16, respectively 16', at the other end of the frame. The cross member or cross members 22, 22' rigidly connect the uprights to form a single moveable unit. The cross member 22, 22' is straight. If there are more than two cross members 22 (respectively 22'), the cross members 22 (respectively 22') are contiguous and coaxial from one end to the other. The cross member 22 is arranged at the upper end of the uprights 14, 16, 18, 20 and 14', 16', 18', 20'. The cross member 22' is positioned at a level lower than the level of the upper end of the uprights 14, 16, 18, 20 and 14', 16', 18', 20'. One of the uprights 14, 14' at one of the ends of the frame projects beyond the end of the wing 3. The upright 16, 16' at the other end of the frame is positioned sufficiently far away from the fuselage 26 to ensure that the fuselage is not damaged when moving the device.

The frame 12 is a load-bearing structure for the cover 7 that is, in the example shown, a wall 28 that can withstand the impact of hail. According to the embodiment illustrated, the wall 28 has a plurality of faces 30 held by guys 32. Each guy 32 is linked either to the frame 12 or to two other guys. The guys 32 define the edges of each of the faces 30. In the example illustrated, the faces 30 are triangular.

The triangular faces 30 may be arranged head to tail to form a global four-sided polygonal surface. The triangular faces may also be arranged side-by-side with an identical apex and an identical side such as to form a larger triangle. The guys 32 and therefore the faces 30 are arranged such as to define a cover shape that, in particular, makes it possible to cover the entire wing 3. The faces 30 are arranged in relation to one another to form the wall 28 extending at least above the surface of the wing. The guys 32 hold the portion of the wall 28 overhanging the frame 12, holding the wall 28 above the wing 3.

The lattice structure of guys 32 helps to lighten the protection device as a whole. Any other lattice form is possible provided that the cover forms a surface covering all of the wing 3.

The wall 28 supported by the guys 32 is made of a material that can withstand the range of possible weather conditions and more specifically hail, for example: lightweight metal, aluminum, steel, etc.

The cover may be any shape. According to one embodiment, the cover is inclined to enable the rain, snow and the like to run off, instead of pooling thereupon. The cover may have several inclines. The cover may overhang entirely on one side of the frame or on both sides thereof, the larger surface being the surface designed to cover the wing.

As shown in FIG. 3, the cover has a portion 40 projecting beyond the rest of the surface of the wall 28 to enable the engine projecting beyond the edge of the wing to be covered and protected as well. The transverse dimension of the portion 40 is greater than the transverse dimension of the rest of the surface of the wall 28.

The edge of the wall 28 facing the aircraft in the operational position is provided with a protective roll 47. The roll is made of a soft material such as foam or the like. The roll surrounds the edge of the wing to prevent damage being caused to the surface of the fuselage when the aircraft or the protection device is being moved.

Each upright 14, 16, 18, 20, 14', 16', 18', 20' has a foot 48, 49 enabling the upright to stand on the ground. The dual uprights (14, 14'), (16, 16'), (18, 18'), (20, 20') have a single foot 48, 49 per pair of uprights. The moveable foot 48 of the uprights (16, 16'), (18, 18'), (20, 20') is balanced using a stabilizer 50. In this case, the stabilizer is an elongate parallelepiped block, and more specifically in the form illustrated is oblong, preventing the upright, and therefore more generally the frame, from swaying under the weight of the overhanging wall. The static foot 49 of the static uprights (14, 14') does not have a stabilizer since the foot is attached to the ground, removably or otherwise, as detailed below. All of the uprights 16, 18, 20 and 16', 18', 20' pivot about an axis Y-Y. The axis Y-Y runs in the direction of the static upright 14 if there is only one or in the case of several uprights, as shown in the figures, equidistantly from the uprights 14, 14' and in all cases, in a direction perpendicular to the ground or to the surface on which the frame stands, or in the embodiment shown, in a direction perpendicular to the direction X-X. To do so, the static foot 49 of the static uprights 14, 14' is attached to the ground by a link enabling at least rotation about an axis Y-Y perpendicular to the surface on which the frame stands, i.e., the ground in the example illustrated, and for example a pivoting or ball joint to enable the frame to rotate about itself.

The feet 48 of the moveable uprights (16, 16'), (18, 18'), (20, 20') are provided with means to enable the frame to facilitate the movement of the uprights over the surface upon which the frame stands. In the embodiment shown, the feet of the moveable uprights (16, 16'), (18, 18'), (20, 20') are provided with at least one caster 52. The means could be any other equivalent device, such as a rack-and-pinion, air cushion, etc.

At least one foot 48 is motorized to enable independent movement. A controller is provided to start/stop the movement. The controller can be any known type, for example electric, pneumatic or hydraulic, and is controlled by a central control member that can be operated by a single operator. In a specific embodiment, the motor is provided near to the moveable uprights 16, 16' that are closest to the aircraft when in the operational position. The motor moves the moveable uprights 16, 16' which, on account of being integral with the rest of the frame, also move the other moveable uprights 18, 18', 20, 20' in rotation about the axis Y-Y.

In the embodiment illustrated, the foot 49 of the static uprights 14, 14' is attached to the ground. Alternatively, the foot 49 of the static uprights 14, 14' may be attached to the ground removably by being provided with locking/unlocking means designed to unlock the link attachment or ball joint to enable movement of the foot 49. In this case, the foot is also provided with a stabilizer.

Figure 4:
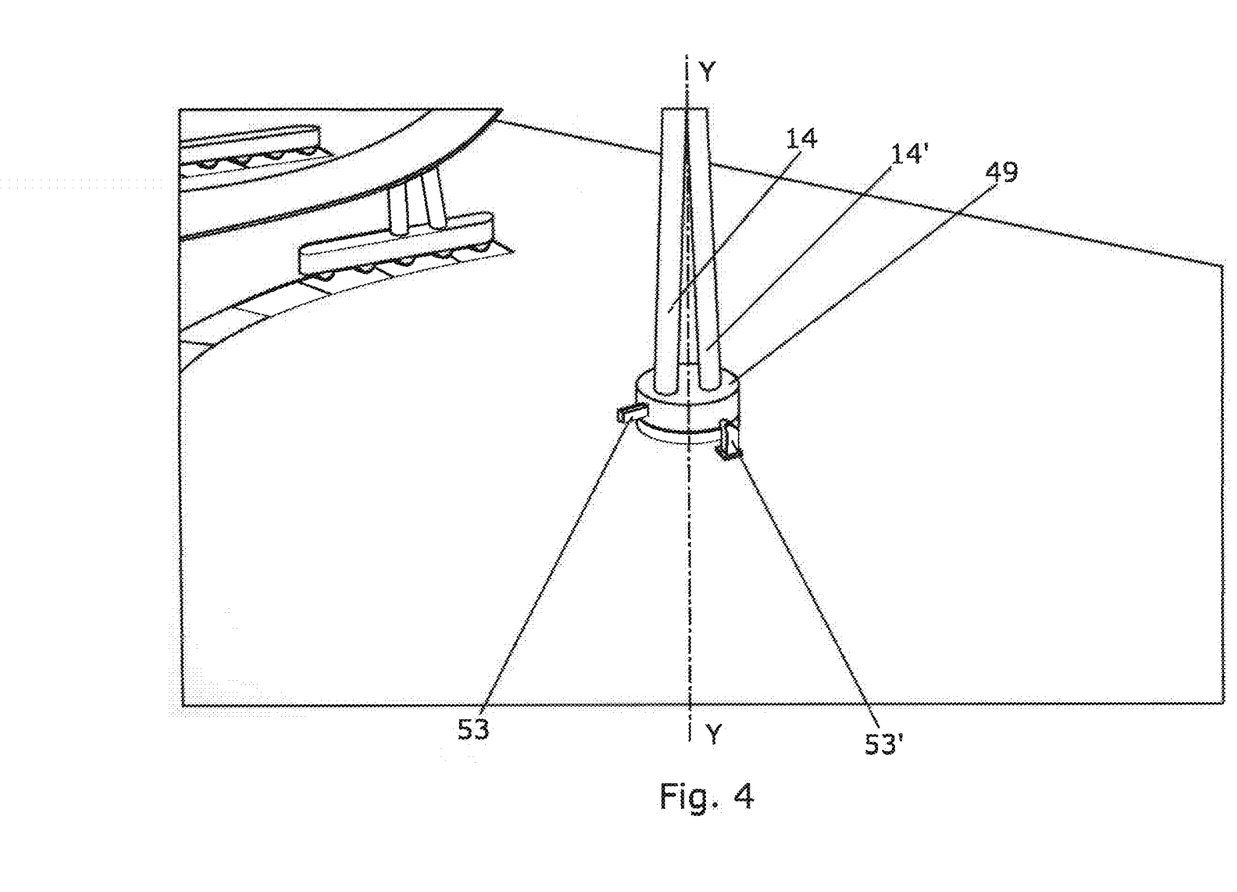
FIG. 4 is a schematic perspective view of the stop in the released position of the protection device shown in the preceding figures.
Figure 5:
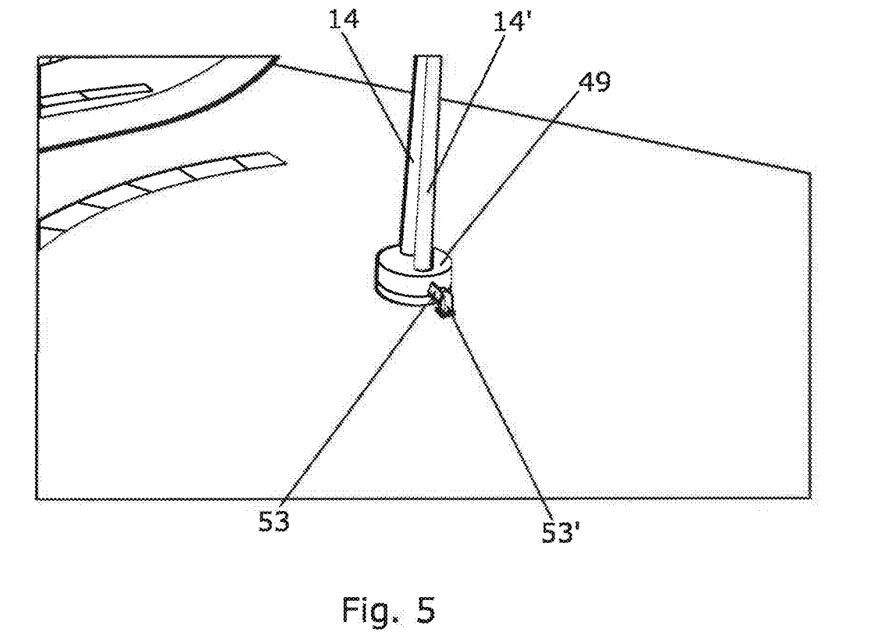
FIG. 5 is a schematic perspective view of the stop in the stopped position of the protection device shown in FIGS. 1 to 3.

As shown in FIGS. 4 and 5, the protection device is provided with an end-of-travel stop 53, 53'. The moveable foot 49 has a projecting portion forming the first moveable portion 53 of the stop, referred to as the end-of-travel control device 53. When the protection device is being moved, the control device 53 moves in rotation. The ground on which the device 1 stands has a second static portion 53' of the stop, referred to as the end-of-travel switch, which is positioned such that the control device 53 stops against the end-of-travel switch 53' attached to the ground. When the device 53 is positioned against the switch, this causes the closure of an electrical contact or actuation of any other mechanical and/or electrical means designed to stop operation of the motorization means (in this case the motor described above), thereby stopping movement of the frame. FIG. 4 shows the movement of the control device 53 towards the end-of-travel switch 53'. FIG. 5 shows the control device 53 stopped against the switch. The stop 53, 53' makes it possible to automatically stop the movement of the protection device when the protection device reaches the end-of-travel stop, thereby preventing the protection device from impacting and damaging the wing.

Figure 6:
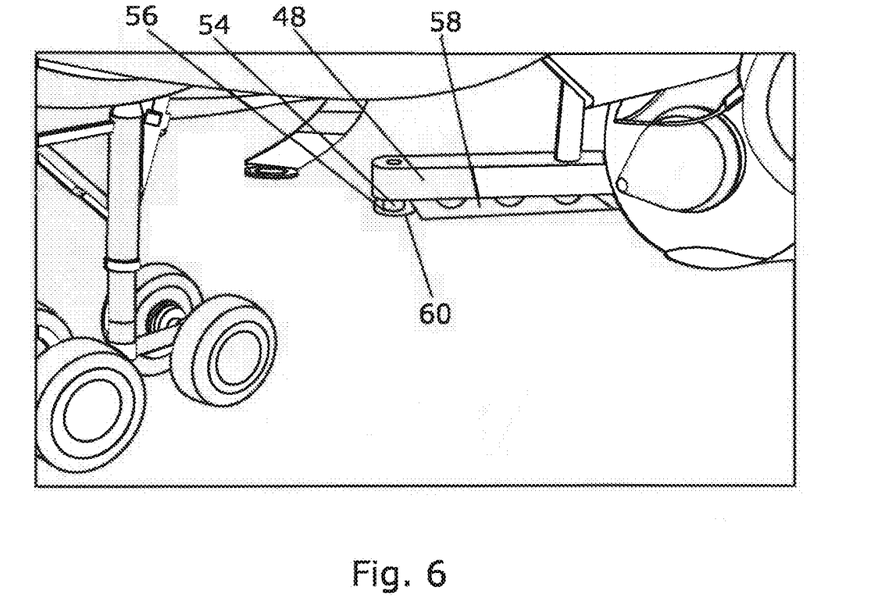
FIG. 6 is a schematic perspective view of the locking device of the protection device shown in FIGS. 1 to 3.

The locking/unlocking means are provided for when the protection device is stopped. FIG. 6 shows a possible embodiment of the locking/unlocking means. The movable foot 48 is provided with a lock in the form of a tooth 54 that can be moved in a vertical direction parallel to the axis Y-Y. A hole 56 is made in the ground in the shape of the tooth such that the tooth 54 can enter the hole 56 to immobilize the foot and thereby the protection device as a whole.

The locking/unlocking means can be provided in the idle position and/or in the operational position.

All other types of locking/unlocking means can be used, such as a system based on a strap and an anchor ring.

Means are provided to block the hole 56 to prevent the ingress of other elements that could damage the locking/unlocking means or make same unusable.

Markings 58 are made on the ground to show the path of the frame. The markings 58 are a strip of brightly colored paint. All other types of marking are possible. A different marking 60 can also be provided to show the locking/unlocking means and, in the example shown in the figures, the hole 56. In the example illustrated, the marking surrounds the hole 56 with a strip of paint in a color different to the color used to show the path of the frame.

In the embodiment shown, the frame is attached to the ground to be positioned near to the leading edge of the wing. In this case, the aircraft can be moved backwards in the event of an emergency. The aircraft is not blocked in by the protection device and there is no need to activate the protection device to put same in the idle position and to release the aircraft.

The protection device moves between an operational position alongside the aircraft shown in FIG. 1 and an idle position shown in FIG. 2. When in the idle position, the frame is arranged in a longitudinal direction parallel to the longitudinal direction of the aircraft or another position removed from the aircraft.

The method for positioning the protection devices 1, 2 firstly includes a step in which an aircraft is positioned between the devices 1, 2 in the idle position. For this purpose, the marking 58 is used to position the aircraft. In this case, the painted strips 58, the leading edge of each of the wings 3, 4 must be directly above the end of each of these strips 58 corresponding to the idle position of the protection device.

Once the aircraft has been positioned between the protection devices, an operator unlocks the protection device by releasing the tooth 54 from the hole 56. The operator then uses a control member such as a button to start the motor in order to pivot the frame 12 of each device 1, 2 about the axis Y-Y and to move the device towards the operational position alongside each wing 3, 4 of the aircraft. The end-of-travel stop 53, 53' stops the movement of the frame once the operational position has been reached. Locking means immobilize the device in the operational position.

The protection device moves as far as the corresponding wing of the aircraft. The frame is arranged alongside a leading edge or trailing edge of the wing such that the wall covers the surface of the wing. As shown previously, in the case illustrated, the protection device is positioned alongside the leading edge to enable the airplane to reverse in the event of an emergency without having to move the protection device.

When the aircraft leaves the location where the aircraft was being stored, the operator unlocks the device and uses the control member to start the motor in order to pivot the frame 12 of each device 1, 2 about the axis Y-Y and to move the frame towards the idle position. The end-of-travel stop 53, 53' stops the movement of the frame once the idle position has been reached. The operator locks the protection device in position.

The protection device enables immediate, rapid and easy positioning requiring very few operators. The protection device provides optimum protection for the operators involved. The protection device can be used on numerous different types of aircraft. When not in use, the device can be used to protect any type of equipment, tools, airplane parts and the like.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A protection device for a wing of an aircraft while the aircraft is on the ground, comprising:
    a protective wall for the aircraft wing sized and shaped to cover an entirety of the aircraft wing;
    a load-bearing structure for the protective wall, the load-bearing structure comprising:
        a supporting frame having at least two uprights linked by at least one cross member extending in a longitudinal direction between the at least two uprights, the supporting frame comprising a lattice structure having guys extending laterally away from the uprights in a cantilevered manner,
        at least one of the uprights, comprising a static upright, at a first end of the frame being attached to the ground by a link permitting at least rotation about one axis,
        the remaining one or more uprights, each comprising a moveable upright and having one foot with means configured to facilitate the movement of the frame over a surface on which the frame stands.

2. The protection device according to claim 1, wherein the protective wall has edges and one of the edges opposite the static upright has a cushioned roll.

3. The protection device according to claim 1, wherein the foot of each of the remaining one or more uprights is provided with a caster, and at least one caster is motorized to enable the frame to be moved.

4. The protection device according to claim 1, wherein the foot of each of the remaining one or more uprights has a stabilizer.

5. The protection device according to claim 1, wherein the cover wall has a width at the first end of the frame and a width at a second, opposite end of the frame, wherein the width at the second end is greater than the width at the first end.

6. The protection device according to claim 1, wherein the cover wall includes a portion extending transversely greater than a transverse dimension of a remainder of the cover wall.

7. A system for protecting wings of an aircraft while the aircraft is on the ground, including two protection devices, each comprising:
   a protective wall for the aircraft wing sized and shaped to cover an entirety of the aircraft wing,
   a load-bearing structure for the protective wall, the load-bearing structure comprising:
   a supporting frame having at least two uprights linked by at least one cross member extending in a longitudinal direction between the at least two uprights, the supporting frame comprising a lattice structure having guys extending laterally away from the uprights in a cantilevered manner,
   at least one of the uprights, comprising a static upright, at a first end of the frame being attached to the ground by a link permitting at least rotation about one axis,
   the remaining one or more uprights, each comprising a moveable upright and having one foot with means configured to facilitate the movement of the frame over a surface on which the frame stands,
   a cushioned roll being arranged at a second end of the frame, opposite the first end
   wherein the surface, on which the aircraft stands, includes attachment means complementing those provided on the linking static upright, enabling at least rotation about an axis perpendicular to said surface.

8. The protection system according to claim 7, wherein a marking visually identifying the path of each protection device is provided on said surface.

9. A method for using the protection device according to claim 1 for a wing of an aircraft, comprising:
   moving the protection device, including a protective wall for the aircraft wing sized and shaped to cover an entirety of the aircraft wing, to the wing of the aircraft,
   arranging the frame alongside a leading edge or trailing edge of the wing such that the wall extends over and covers an entire surface of said wing.

10. The method according to claim 9, further comprising:
    positioning the aircraft between two protection devices,
    moving the protection devices to an operational position in which the wings of the aircraft are protected,
    stopping and locking the protection devices in an operational position,
    moving the protection devices to an idle position in which the aircraft is released,
    stopping and locking the protection devices in the idle position.

11. A protection device system for use with an aircraft on the ground, comprising:
    an aircraft having a wing of a predetermined size and shape;
    a protective wall for the aircraft wing sized and shaped to cover an entirety of the aircraft wing;
    a load-bearing structure for the protective wall, the load-bearing structure comprising:
    a supporting frame having at least two uprights linked by at least one cross member extending in a longitudinal direction between the at least two uprights, the supporting frame comprising a lattice structure having guys extending laterally away from the uprights in a cantilevered manner,
    at least one of the uprights, comprising a static upright, at a first end of the frame being attached to the ground by a link permitting at least rotation about one axis,
    the remaining one or more uprights, each comprising a moveable upright and having one foot with means configured to facilitate the movement of the frame over a surface on which the frame stands.

12. The protection device according to claim 11, wherein the protective wall has edges and one of the edges opposite the static upright has a cushioned roll.

13. The protection device according to claim 11, wherein the foot of each of the remaining one or more uprights is provided with a caster, and at least one caster is motorized to enable the frame to be moved.

14. The protection device according to claim 11, wherein the foot of each of the remaining one or more uprights has a stabilizer.

* * * * *